Dec. 21, 1937. L. C. JACKSON Re. 20,597
INTERNAL COMBUSTION ENGINE
Original Filed Nov. 9, 1914
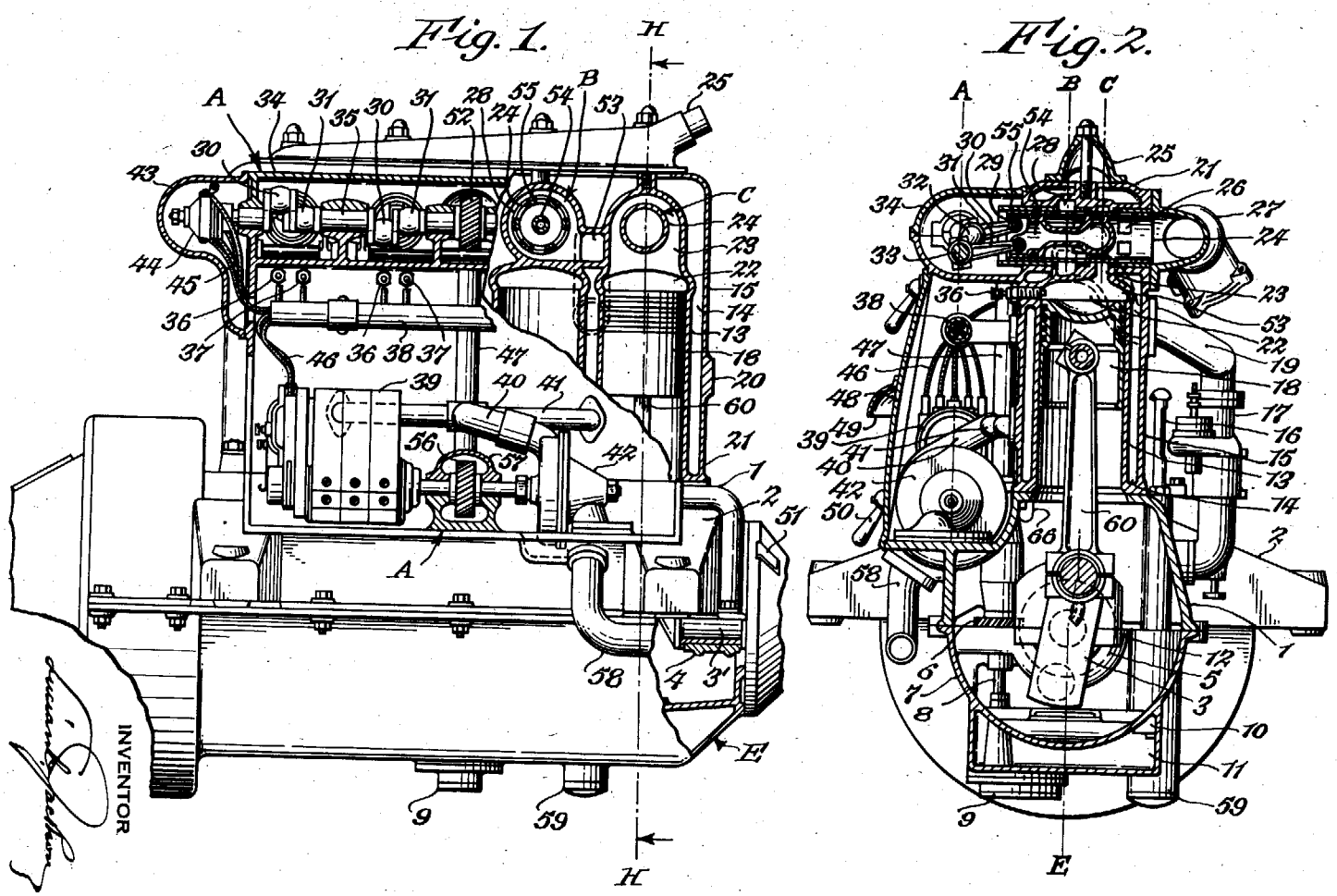

Reissued Dec. 21, 1937

Re. 20,597

UNITED STATES PATENT OFFICE 20,597

INTERNAL COMBUSTION ENGINE

Lucian C. Jackson, Buffalo, N. Y.

Original No. 1,898,963, dated February 21, 1933, Serial No. 314,279, July 30, 1919, which is a division of application November 9, 1914, Serial No. 871,042, now Patent No. 1,314,487, dated August 26, 1919. This application for reissue February 21, 1935, Serial No. 7,580

19 Claims. (Cl. 123—195)

This application is a division from the original specification of Lucian C. Jackson, Internal combustion engines, Serial No. 871,042, filed Nov. 9, 1914 and patented Aug. 26, 1919, Patent No. 1,314,487.

This invention relates to internal combustion engines and more particularly to the general engine structure.

It has for its objects to provide an improved, durable and efficient engine; in an improved method of water jacketing all operating parts; and in particular an improved method of enclosing and housing all moving parts and especially all electrical generating and distributing apparatus and connections as well as other adjuncts, thereby excluding all foreign matter from their working parts or which might in any way interfere with their proper operation.

With these objects in view, the invention consists in certain features of novelty in the construction, combination and arrangement of parts by which the said objects and certain other objects which will hereinafter appear are attained, the invention being more particularly pointed out in the claims.

Like parts are identified by the same reference characters in both views.

In the drawing accompanying and forming a part of this specification, Figure 1 is a side elevation, partly in section as follows: At A and A as on line A in Fig. 2; at B as on line B of Fig. 2; at C as on line C of Fig. 2 and at E as on line E of Fig. 2. Fig. 2 is a sectional elevation on line H—H of Fig. 1; showing the valve mechanism and enclosed water pump and magneto on one side and the carburetor and exhaust pipe on the other.

In the figures, 1 is the engine crankcase and having supporting arms 2, 2 etc. for supporting the engine; 3 is the crankshaft, showing one end journal 3' and its bearing cap 4. 12 is the center bearing cap. 60 is the connecting rod and 18 the piston.

On the crankshaft 3 midway between the four cylinders shown is mounted a spiral gear 5 which meshes with and drives the gear 6 faster on the lower end of vertical shaft 47. Spiral gear 56 on shaft for driving magneto 39 and water pump 42, meshes with and is driven by a spiral gear (not shown) on vertical shaft 47. The valve shaft 35, which is in the nature of a small crank shaft, is driven by the spiral gear 52 mounted at its center and which is in turn driven by a spiral gear (not shown) on the upper end of vertical shaft 47.

57 is a cover for the spiral gears which drive the magneto 39 and water pump 42, and one of which gears is shown at 56. 34 is a cover for the valve shaft 35 and its connections. 43 is a cover for the distributor 44 which is mounted on the end of valve shaft 35 and also for connecting wires 45 to the spark plugs 36, 36 etc. 48 is a main cover for the pump 42, magneto 39 and wires 46 to the wire carrier 38 and thence to the spark plugs 37, 37 etc. 50 is one of the hand nuts for fastening the cover 48 to the engine. 49 is a handle for lifting cover 48.

This covering of magneto and wiring is for the purpose of protecting them from all dust and dirt and also moisture which is liable to short circuit any electrical apparatus which is not properly protected. This is also illustrative of the use of the invention to the protecting of all other electrical or other apparatus, as generator, pump etc. which may be in use on the engine.

58 is the water inlet for pump 42 and 40 the outlet and 41 the water manifold to the cylinders. 25 is the cylinder water outlet manifold. 13 is the cylinder wall; 14 the water jacket space which extends around the valve mechanism as well as to the bottom of the cylinders making them completely water jacketed; and 15 is the water jacket wall.

21 is the cylinders of a four cylinder engine cast en bloc, as a convenient means of construction, though the head can be cast separate as in the usual construction, for cleaning the top of the pistons though they can be as easily removed from below and the necessity for removing the head to take out and clean valves does not exist in my construction. My valves are easily removed from the top and carbon does not interfere with their operation as with the poppet valve.

The parts of all cylinders and their valve mechanism is the same. In No. 1 cylinder 22 is the compression space; 23 a valve pocket extending up from the compression space; 18 is the piston and 60 the connecting rod; 17 is a carburetor taking part of its air supply from the crank case and through the bearings which helps to cool the bearings and heat the air intake. A screen (not shown) is in this air intake near its connection to the crank case. 19 is one of two branches from the carburetor 17 which carries a fuel charge to cylinders Nos. 1 and 2 by means of a passage 53 between cylinders 1 and 2 and to the chambers 28, 28 surrounding the valve mechanism of the two cylinders. A similar branch 19 (not shown) from the carburetor to a passage 53 carries the fuel to the cylinders 3 and 4 in like manner. 27 is an exhaust pipe connecting with each of the four cylinders.

24 is a sleeve valve having ports 26 for inlet and exhaust to register with valve pocket 23. 54 is a piston valve in the sleeve valve 24. 55 is a bushing on the crank end of sleeve valve 24 to control its fuel intake ports from the carburetor. 30 and 31 are connecting rods between the sleeve valve 24 and the valve shaft 35 and the piston valve 54 and the valve shaft 35 respectively. 29 is the sleeve pin for connecting rod 30, and 32 is the crank pin of sleeve 24. 33 is crank pin of piston 54.

7 is the engine oil pan. 9 is an oil pump for circulating the oil in any approved manner to all of the bearing surfaces as required and from which the oil is returned to be strained and again circulated. 8 is the oil pump shaft inserted into the lower end of vertical shaft 47 and driven by the latter. 10 is a float in housing 59 and on an oil gauge, which extends up into the housing 16 to show the oil level in the oil well 11. 66 is an opening by which the gear 56 and the vertical shaft 47 are lubricated by splash from the crank case 1.

The pad 20 on front of cylinder is for supporting a fan which can be driven by a belt which runs through the slot 51.

Having thus described my invention I claim:—

1. In an internal combustion engine, having a cylinder with a combustion chamber, in combination with a source of fuel supply, a crank shaft and means for rotating said crankshaft, electrical generating apparatus for furnishing ignition for the fuel in said combustion chamber, means to operate said electrical generating apparatus from said crank shaft a crank case, means to lubricate said operating means from said crankcase and means formed from said cylinder to entirely enclose said electrical generating apparatus on said engine.

2. In an internal combustion engine, having a combustion chamber, a source of fuel supply for said chamber, a spark plug for said chamber, electric generating apparatus for furnishing ignition for the fuel in said chamber, means to operate said electric generating apparatus a crankcase, means to lubricate said operating means from said crankcase, connections from said electric apparatus to said spark plug, and means to entirely enclose said electric apparatus, electric connections and spark plugs on said engine.

3. In an internal combustion engine, having a combustion chamber, spark plugs for said chamber, a magneto for furnishing electric current to one of said spark plugs, a separate distributor for timing an electric current to another one of said spark plugs and means to enclose said magneto, distributor and spark plugs on said engine.

4. In an internal combustion engine, having a cylinder with combustion chamber, a source of fuel supply for said chamber, means for electrically firing a fuel charge in said chamber a crankcase, a crankshaft, a magneto, means to operate said magneto, from said crankshaft means to lubricate said operating means from said crankcase and means formed from said cylinder to entirely enclose said magneto on said engine.

5. In an internal combustion engine, a cylinder in combination with a crankshaft and means to rotate said crankshaft, electrical generating apparatus, means to operate said electrical generating apparatus from said crankshaft and chamber means with a cover formed from said cylinder to enclose said electrical generating apparatus on said engine whereby dirt and moisture may be entirely excluded from said electrical apparatus.

6. In an internal combustion engine, in combination with a crankshaft and means for rotating said crankshaft, a crankcase a distributor for timing an electric current, means to operate said distributor from said crankshaft means to enclose said distributor operating means on said engine and means to lubricate said operating means from said crankcase.

7. In an internal combustion engine, in combination, with a crankshaft and means to rotate said crankshaft, a cylinder having a combustion chamber pump means to cool said combustion chamber and means formed from said cylinder to enclose said pump means on said engine.

8. In an internal combustion engine, a cylinder having a combustion chamber, a spark plug for said chamber, a crankshaft a crankcase, a pump to cool said engine, means to operate said pump from said crankshaft means to lubricate said operating means from said crankcase and means formed from said cylinder to enclose said spark plug and said pump on said engine.

9. In an internal combusion engine having multiple cylinders and a combustion space for each cylinder, in combination, with a crankshaft and means to rotate said crankshaft, a crankcase apparatus for generating an electric current, means to operate said apparatus from said crankshaft means to lubricate said operating means from said crankcase, a chamber formed from said cylinders to enclose said apparatus and a removable cover for said chamber.

10. In an internal combustion engine having multiple cylinders and a combustion space for each cylinder, in combination, with a crankshaft and means to rotate said crankshaft, a spark plug for each of said combustion spaces, a distributor for timing an electric current to each of said spark plugs, and cover means for enclosing said spark plugs and said distributor on said engine.

11. In an internal combustion engine having multiple cylinders and a combustion space for each cylinder, in combination, with a crankshaft and means to rotate said crankshaft, apparatus for generating an electric current, means to operate said apparatus from said crankshaft, spark plugs for each of said combustion spaces, means to furnish an electric current to each of said spark plugs in turn, and chamber means formed from said engine cylinders and having a cover to entirely enclose said electrical generating apparatus on said engine.

12. In an internal combustion engine having multiple cylinders and a combustion space for each cylinder, in combination, with a crankshaft a crankcase, a piston in each cylinder, means to operate said crankshaft from said pistons, valves for said cylinders and means to operate said valves from said crankshaft, chamber means on said engine to enclose said valve operating means, means to lubricate said operating means from said crankcase electrical generating and utilizing apparatus to cooperate in the operation of said pistons and chamber means on said engine to entirely enclose said electrical apparatus on said engine, whereby all moisture may be excluded from said electrical apparatus.

13. In an internal combustion engine of the four stroke cycle type having multiple cylinders and a combustion space for each cylinder, in combination, with a crank case, a crankshaft in said crankcase, a piston in each of said cylinders, means to operate said crank shaft from said pistons, valves above said combustion spaces to control the fuel intake and exhaust from said combustion spaces, valve mechanism to operate said valves from said crankshaft, a fixed chamber to enclose the valve operating mechanism passing on the side of said cylinders, said chamber including walls integral with and extending away from the side of said cylinders to enclose said valve mechanism, and a second stationary chamber having a fixed opening closed by a removable cover to enclose the valve operating mechanism from said first named chamber to said valves.

14. In an internal combustion engine having a cylinder with a compression space, a crankcase, a crankshaft, a piston in said cylinder, means to operate said crankshaft from said piston, valves communicating with said compression space, means to operate said valves from said crankshaft gear means on said crankshaft in said crankcase to drive said valve operating means, means to lubricate said gear means by the oil splash in said crankcase, chamber means on said cylinder to inclose said valve operating means, an oil tight cover for said chamber, and means to supply oil to said chamber means to lubricate said valve operating means.

15. In an internal combustion engine, a cylinder with a compression space, a spark plug for said compression space, moisture proof means for enclosing said spark plug, a crankcase, a crankshaft in said crankcase, a piston in said cylinder, a rod connecting said piston and crankshaft, valves controlling ports to said compression space, means to operate said valves from said crankshaft, gear means on said crankshaft in said crankcase to drive said valve operating means, means to lubricate said gear means by the oil splash in said crankcase, oil tight chamber means on said cylinder to inclose said valve operating means and splash means to lubricate said valve operating means in said chamber from said crankcase.

16. In an internal combustion engine having cylinders, a compression space for each cylinder, a source of fuel supply for said compression spaces, means to ignite the fuel in each of said compression spaces, a crankcase, a crankshaft in said crankcase, a piston in each cylinder, means to operate said crankshaft from said pistons, valves to control ports to the compression space of each cylinder, means to operate said valves from said crankshaft, gear means on said crankshaft in said crankcase to drive said valve operating means, means to lubricate said gear means by the oil splash in said crankcase, oil tight means on said cylinders to inclose said valve operating means, said crankcase having oil holding means and means to supply oil from said crankcase to said oil tight means to lubricate said valve operating means.

17. In an internal combustion engine having a cylinder with a compression space, a crankshaft, a piston in said cylinder, means to operate said crankshaft from said piston, valves communicating with such compression space, means to operate said valves from said crankshaft, a chamber enclosing the valve operating means, said chamber including a wall integral and extending away from the side of said cylinder, the front wall of said chamber comprising an oil tight cover, a crankcase, gear means on said crankshaft in said crankcase to drive said valve operating means, means to lubricate said gear means by the oil splash in said crankcase, and a crankcase enclosing wall contiguous to the valve operating means chamber and perforated so that oil from the crankcase chamber is supplied to the valve operating means.

18. In an internal combustion engine having a cylinder with a compression space, a crankshaft, a piston in said cylinder, means to operate said crankshaft from said piston, valves communicating with such compression space, means to operate said valves from said crankshaft, a six-sided chamber for enclosing the valve operating means, the walls of such chamber comprising a top wall, a bottom wall, two side walls, a back wall formed by the cylinder, and an oil-tight cover forming the front wall, a crankcase, gear means on said crankshaft in said crankcase to drive said valve operating means, means to lubricate said gear means by the oil splash in said crankcase, and a crankcase enclosing wall contiguous to the valve operating means chamber and perforated so that oil from the crankcase chamber is supplied to the valve operating means.

19. In an internal combustion chamber having a cylinder with a compression space, a crankcase, a crankshaft, a piston in said cylinder, a connecting rod between said crankshaft and said piston, valves communicating with said compression space, valve operating means between said crankshaft and said valves, electric generating apparatus, gear means in said crankcase to operate said electric generating apparatus from said crankshaft, gear means on said crankshaft in said crankcase to drive said valve operating means, means to lubricate said gear means by the oil splash in said crankcase, fixed chamber means to enclose said valve operating means, means to form an opening between said crankcase and said fixed chamber means and means to lubricate said valve operating means and said generating apparatus gear from said crankcase.

LUCIAN C. JACKSON.